United States Patent [19]

Richards

[11] Patent Number: 5,172,720
[45] Date of Patent: Dec. 22, 1992

[54] SINGLE SEAL FLUID CONTROL VALVE
[75] Inventor: Donald L. Richards, Durham, N.C.
[73] Assignee: Eaton Corporation, Cleveland, Ohio
[21] Appl. No.: 829,643
[22] Filed: Feb. 3, 1992
[51] Int. Cl.[5] .............................................. F16K 15/06
[52] U.S. Cl. ............................. 137/454.5; 137/234.5; 137/541
[58] Field of Search .................... 137/234.5, 454.5, 541

[56] References Cited

U.S. PATENT DOCUMENTS

| | | | |
|---|---|---|---|
| 669,414 | 3/1901 | Hilton | 137/234.5 |
| 1,917,499 | 7/1933 | Conrad | 137/234.5 |
| 2,451,276 | 10/1948 | Crowley . | |
| 2,658,716 | 11/1953 | Winfree | 137/454.5 X |
| 2,971,526 | 2/1961 | Boyer et al. . | |
| 3,207,172 | 9/1965 | Steer | 137/234.5 |
| 3,422,837 | 1/1969 | Boyer et al. . | |
| 3,568,708 | 3/1971 | Ashman | 137/234.5 |
| 3,910,223 | 10/1975 | Krohn . | |
| 4,097,075 | 6/1978 | Clayton . | |
| 4,481,970 | 11/1984 | Ried . | |

Primary Examiner—Robert G. Nilson
Attorney, Agent, or Firm—A. E. Chrow

[57] ABSTRACT

A single seal fluid control valve (100) is provided that has a guide member (12) secured within a chamber (34) of a body member (2) such that an outer portion of a sealing member (18) secured to an annular securement surface (21) of guide member (12) is compressed against an annular sealing surface (17) of a shoulder (26) extending from body member (2) into chamber (34) to prevent fluid leakage therebetween. An inner exposed portion of sealing member (18) is engagable by an enlarged head (16) of a pin member (31) that is guided by and reciprocally movable relative guide member (12) and operative to compress the exposed portion of sealing member (18) sufficiently to prevent fluid leakage therebetween when urged thereagainst by a biasing spring (20) when fluid pressure at an inlet (6) of body member (2) is less than required to overcome the biasing force.

16 Claims, 3 Drawing Sheets

SINGLE SEAL FLUID CONTROL VALVE

INTRODUCTION

This invention relates generally to a valve for controlling fluid flow and more particularly to a fluid control valve having a singular sealing member that is operative to prevent fluid leakage between a guide member and a body member in which the guide member is secured and is also engagable with an enlarged head of a pin member reciprocally supported by the guide member and operative to prevent fluid leakage therebetween.

The control valve of the invention is particularly useful for charging and for discharging a vessel with fluid such as a refrigerant fluid used in a vehicular air conditioning system.

BACKGROUND OF THE INVENTION

Fluid control valves of the type to which the present invention is addressed have characteristically employed at least two resilient sealing members of which one is operative to prevent fluid leakage between a guide member for guiding a pin member having an enlarged head for reciprocal movement relative thereto and an insert in which the guide member is secured and another resilient sealing member that is commonly carried by the pin member and operative to prevent fluid leakage between an enlarged head of the pin member and the guide member upon engagement therebetween.

Examples of fluid control valves requiring at least two of such seals are disclosed in U.S. Pat. Nos. 2,451,276; 2,971,526; 3,910,223 and 4,097,075, the disclosures of which are incorporated herein by reference and the last two of which are assigned to the assignee of the present invention.

As example of a one-way filling valve utilizing an elastomeric sealing member having a self sealing slit acting as the valve is disclosed in U.S. Pat. No. 3,4422,837, the disclosure of which is incorporated herein by reference. Here however, the sealing member does not seal a reciprocable pin member but rather acts as the valve itself.

An example of a tire valve utilizing a singular elastomeric sealing member is described in U.S. Pat. No. 4,481,970, the disclosure of which is incorporated herein by reference. Here however, the guide member is not secured within the body member and the sealing member is required to have a length that is substantially greater than its diameter and requires that the fluid collapse the sealing member about the stem of the pin member in order to effect the seal.

The control valve of the present invention utilizes a singular sealing member that is simple in design and operative to effect a fluid seal between the body member and a guide member and also between the guide member and an enlarged head of a pin member reciprocally movable relative the guide member without requiring that the seal be collapsed above the stem of the pin member in order to effect a fluid seal therebetween.

SUMMARY OF THE INVENTION

Accordingly, it is an object of this invention to provide a fluid control valve having a singular sealing member operative to provide a fluid tight seal between a guide member secured to a body member and also between the guide member and an enlarged head of a pin member reciprocally movable relative the guide member.

It is another object of this invention to provide a fluid control valve that is advantageously operative for filling a container or vessel with pressurized fluid such as a fluid refrigerant and that utilizes a singular sealing member effective to prevent fluid leakage between a body member and a guide member secured thereto and between an enlarged head of a pin member reciprocally movable relative the guide member.

DESCRIPTION OF SOME PREFERRED EMBODIMENTS

Figure 1:
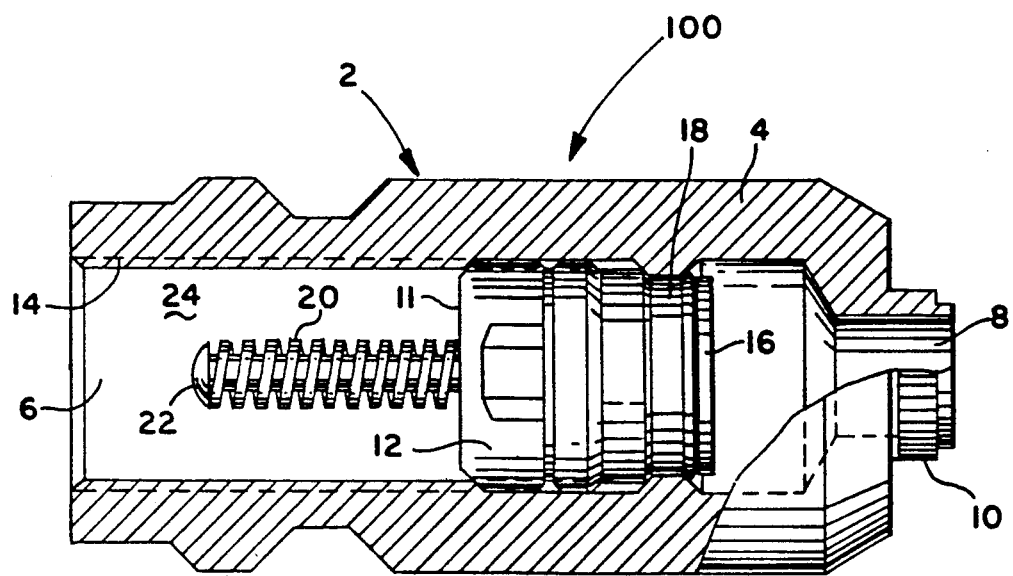
FIG. 1 is a partial central cross-sectional view of a single seal fluid control valve 100 made in accordance with the invention.
Figure 2:
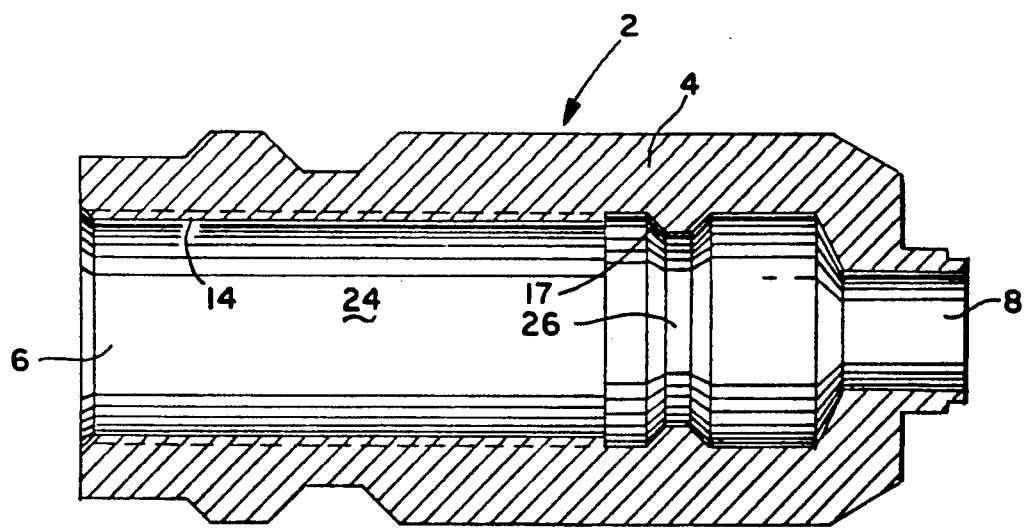
FIG. 2 is a central cross-sectional view of a body member used in control valve 100 of FIG. 1.

A preferred embodiment of the single seal fluid control valve of the invention is referenced by numeral 100 in FIG. 1. Control valve 100 has a body member 2 shown in FIGS. 1 and 2. Body member 2 has a wall 4 surrounding a chamber 24 extending therethrough between an inlet 6 and an outlet 8. An annular shoulder 26 extends from wall 4 into chamber 24 that has an annular sealing surface (not referenced) that faces inwardly towards the centerline of body member 2 and has an annular sealing surface 17 facing towards inlet 6 as shown in FIG. 2.

Although body member 2 preferably has a cylindrical or tubular configuration as shown in the FIGURES, it may have other configurations suitable for particular applications. Chamber 24 may for example have a tubular configuration whereas the outer surface of wall 4 may have another cross-sectional configuration.

Although shoulder 26 may be construed to divide chamber 24 into two chambers, it is to be understood that chamber 24 is referred to in the singular herein for convenience regardless of how many chambers in fluid communication with each other are provided body member 2 operates in the manner required by the control valve of the invention.

A guide member 12 is secured to body member 2 within chamber 24. Although guide member 12 may be secured to body member 2 in any suitable manner, it is preferably releasably threadingly secured by having threads 30 in its outer surface shown in FIG. 3A that, upon rotation, threadingly engage threads 14 on the inner surface of wall 4 as shown in FIG. 1.

Like body member 2, guide member 12 preferably has a cylindrical or tubular shape, particularly when it is adapted to be threadingly secured to body member 2.

A section of wall 4 surrounding outlet 8 has a reduced section having a smaller diameter than the diameter of the adjacent outer surface of body member 2. As shown in FIG. 1, the reduced section has knurls 10 operative to provide a knurled section that is effective in fixedly securing body member 2 to a vessel such as hereinafter described with respect to FIG. 10. Other examples of various ways that a section of wall 4 of body member 2 surrounding outlet 8 can be adapted to secure the outlet end of body member 2 to a vessel are hereinafter described with respect to FIGS. 7-9.

Guide member 12 guides a pin member 31 (shown in FIGS. 4 and 5) for reciprocal movement relative thereto as hereinafter described with respect to FIG. 5.

Figure 4:
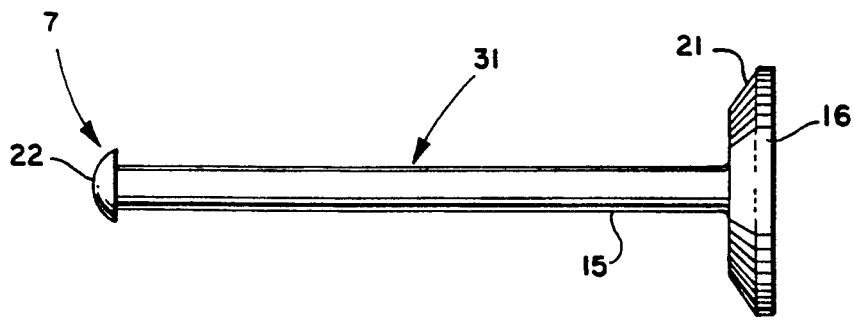
FIG. 4 is a side view of a pin member and an end-cap 22 used in control valve 100 of FIG. 1.
Figure 5:
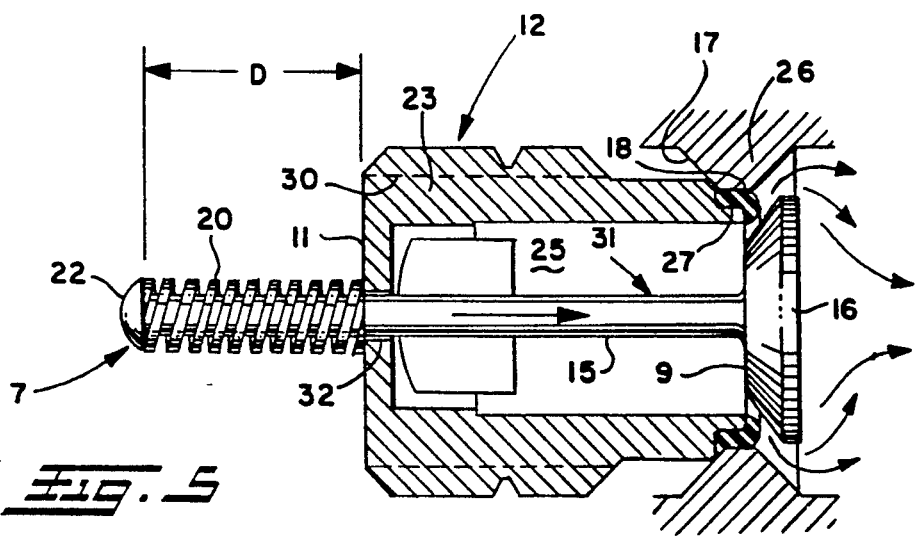
FIG. 5 is a central cross-sectional view of the guide member of FIGS. 1, 3A and 3B and a partial side view of the pin member of FIG. 4.

Pin member 31 has an enlarged head 16 shown in FIGS. 1 and 4 from which a stem 15 extends substantially transversely away from as shown in FIGS. 4 and 5.

Guide member 12 has a wall 23 surrounding a chamber 25 extending therethrough between an open-end 9 and a closed-end 11. Closed-end 11 has a port 32 extending therethrough.

An annular securement surface 27 is defined in wall 23 surrounding open-end 9. Although surface 27 preferably has a stepped cross-sectional configuration provided by a portion of wall 23 having a reduced diameter adjacent open-end 9 as shown in FIG. 5, it may have any cross-sectional configuration that provides a surface to which an annular sealing member referenced by numeral 18 can be suitably secured such as by bonding or molding the sealing member thereto or by tension arising from stretching sealing member 18 thereabout or by any other method provided the control valve operates in the manner desired.

Sealing member 18 faces away from closed-end 11 and is preferably a resilient sealing member such as made from a suitable resilient rubber. A rubber meeting established relevant standards is preferred when the fluid whose flow is being controlled is a refrigerant such as used in a vehicular air conditioning system.

As shown in FIG. 5, an outer portion of sealing member 18 is adapted to engage sealing surface 17 and the annular sealing surface of shoulder 26 that faces inwardly towards the centerline of body member 2.

Guide member 12 is secured in chamber 24 of body member 2 such that sealing member 18 is compressed against sealing surface 17 to provide a fluid-tight seal thereat between guide member 12 and body member 2.

An inner portion of sealing member 18 is exposed to outlet 8 of body member 2 and engagable by a surface of enlarged head 16 of pin member 31 facing theretowards. Head 16 is preferably cylindrical in shape and has an annular surface adjacent its outer periphery that faces towards sealing member 18 and is engagable therewith. The annular surface of head 16 engagable with sealing member 18 is preferably a tapered surface such as referenced by numeral 21 in FIGS. 4 and 6 that tapers radially outwardly away from free-end 7.

As shown in FIG. 5, stem 15 extends from head 16 through open-end 9, chamber 25 and port 32 through closed-end 11 of guide member 12. Stem 12 then extends for a predetermined distance "D" therebeyond to free-end 7 usually determined when head 16 is fluid seal engagement with sealing member 18 such as shown in FIG. 6.

Figure 6:
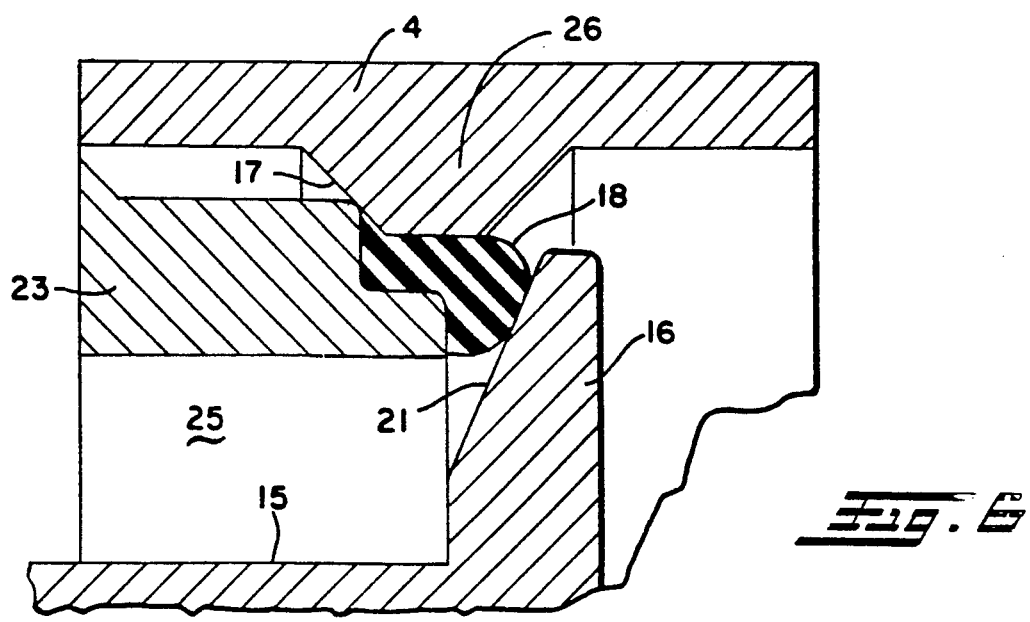
FIG. 6 is a partial central cross-sectional view through a control valve of the invention showing the sealing member in a compressed state.

A biasing means is employed to bias pin member 31 in a direction towards inlet 6 which is towards the viewer's left as viewed in FIGS. 5-6. Preferably, the biasing means is in the form of coiled spring 20 coaxially disposed about stem 15 between free-end 7 and closed-end 11 of guide member 12 as shown in FIGS. 1 and 5. Spring 20 is contained about stem 15 between free-end 7 and closed-end 11 of guide member 12 preferably by means of a heading operation on the free-end of stem 15 to provide what appears like an end Cap referenced by numeral 22.

Spring 20 is selected to provide a biasing force operation to urge pin member 31 and its head 16 towards the viewer's left as viewed in FIG. 5 and compress head 16 against the inner exposed portion of sealing member 18 sufficiently to provide a fluid-tight seal therebetween as shown in FIG. 6 when fluid pressure at inlet side 6 body member 2 is less than the fluid pressure at outlet side 8 to prevent fluid from flowing out of a vessel to which the outlet 8 end of body member 2 is secured.

When the fluid pressure at inlet 6 of body member 2 is greater than the fluid pressure at outlet 8 by an amount sufficient to overcome the biasing force of spring 20, a force is imparted against head 16 of pin member 31 that is operative to move pin member 31 and head 16 towards the viewer's right as viewed in FIG. 5 which is towards outlet 8 of body member when guide member is secured within chamber 34 in the manner hereinbefore described. The movement disengages head 16 from sealing member 18 and enables fluid to flow in a direction from inlet 6 towards outlet 8 of body member 2. Such is the condition shown in FIG. 5 where head 16 is disengaged from sealing member 11 and the fluid flow is towards the viewer's right as shown by the arrows. Pin member 31 may also be mechanically moved to disengage head 16 from sealing member 18 by pressing on free-end 7 of stem 15 with a force that exceeds the oppositely directed biasing force provided by spring 20. Such is commonly accomplished by means of a pin extending from a pressurized fluid source dispenser.

Thus head 16 of pin member 31 is biased against sealing member 18 to provide a fluid-tight seal therebetween when fluid pressure at outlet 8 of body member 2 exceeds the fluid pressure at inlet 6 enabling the control valve to prevent fluid from leaking from a vessel to which the outlet 8 end of body member 2 is secured when the fluid pressure in the vessel exceeds the fluid pressure at inlet 6. Conversely the control valve of the invention can be used to charge a vessel such as a refrigerant reservoir with pressurized refrigerant fluid when pin member 31 is pressed mechanically to disengage head 16 from sealing member 18 and/or by exposing the inlet side of the body member to fluid pressure sufficient to overcome the biasing force provided by the biasing means holding head 16 against sealing member 18 so that head 16 disengages from sealing member 18 enabling fluid to inlet 6 toward outlet 8 and into the reservoir. In instances where the control valve of the invention is to be used to control fluid refrigerant flow, a spring is preferably selected to provide a biasing force of at least one atmosphere plus a suitable safety factor since refrigerant reservoir such as used in vehicular air conditioning systems are now purged under a vacuum of commonly about one atmosphere for environmental protection.

Figure 3A:
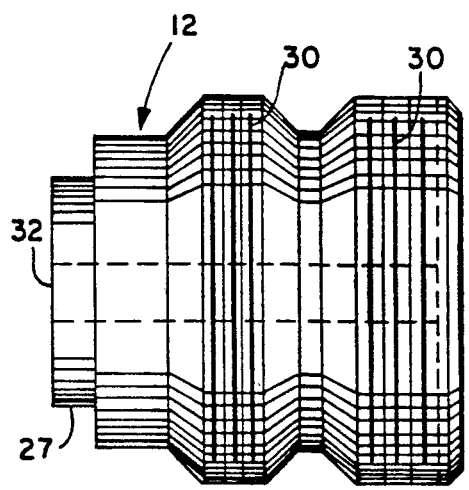
FIGS. 3A and 3B is a side view and an end view respectively of a guide member used in control valve 100 of FIG. 1.
Figure 3B:
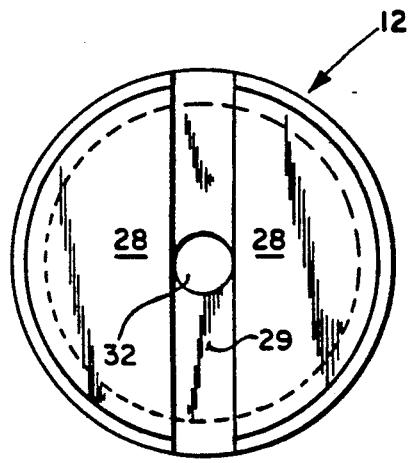

As hereinbefore described with respect to FIGS. 3A and 3B, guide member 12 may be provided with external threads 30 for engaging threads on the inner surface of wall 4 of body member 2 when guide member 12 is adapted to be releasably threadingly secured thereto. In such instance the guide member is called a swivel member in the trade since it must be swiveled or rotated to advance it along the threads in the inner surface of wall 4 of body member 2.

The ability to rotate guide (swivel) member 12 is enhanced by guide member 12 preferably including a slot 29 shown in FIG. 3B in the end opposite to the end to which sealing member 18 is secured to securement surface 27 and into which the end of a tool such as a screw driver can be inserted to facilitate the process of rotating guide member 12.

As previously described, FIG. 6 illustrates the condition when annular surface 21 of head 16 is urged against sealing member 18 with sufficient force to provide a fluid tight seal therebetween. As shown in FIG. 6, the taper on surface 21 enables a portion of seal 18 to expand or bulge in opposite directions along surface 21 when compressed thereagainst to further enhance the fluid seal between head 16 and sealing member 18.

Figure 7:
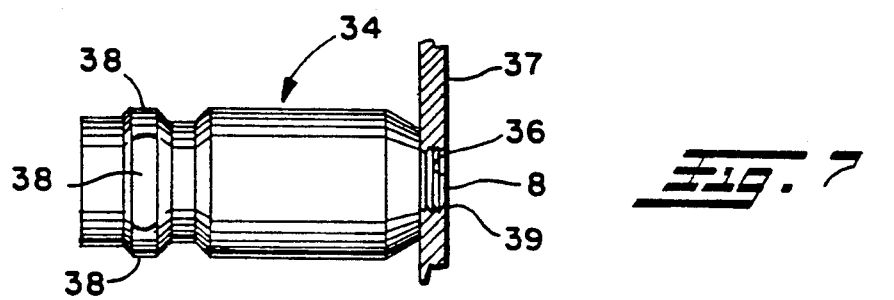
FIGS. 7-9 are side views of other preferred embodiments of body members for use with a control valve of the invention.
Figure 8:
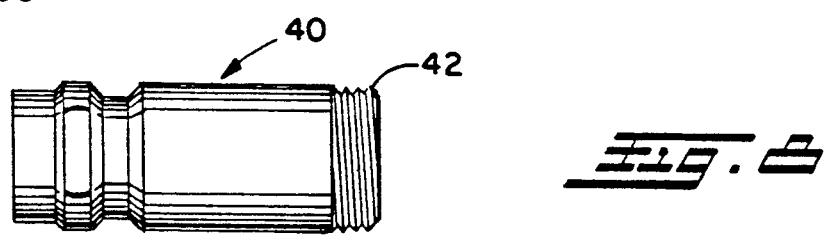
Figure 9:
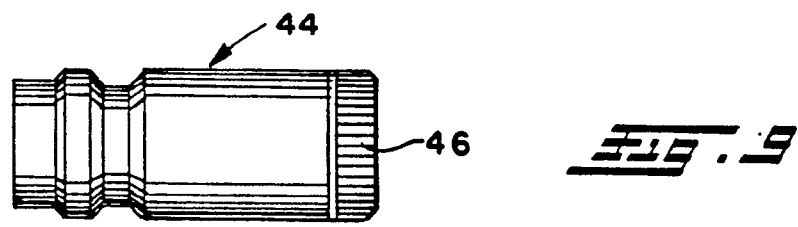

Although other ways may be devised to secure outlet 8 of body member 2 to a vessel such as a tank, tube, reservoir or hose or the like, operative to contain pressurized fluid, two preferred ways are shown in FIGS. 7–9.

In FIG. 7, a vessel wall 37 has a threaded opening 39 therethrough into which a reduced section surrounding outlet 8 of a body member 34 of a control valve of the invention is threadingly secured. In order to facilitate the rotation of guide or swivel member 34 at least one pair of opposed flats referenced generally by numeral 38 are disposed in the outer surface hereof for engagement by a wrench or the like.

In FIG. 8, an embodiment of a body member referenced by numeral 40 is shown to illustrate that the outer surface at its outlet end need not be a section of reduced diameter and yet include threads 42 for releasably securing body member 46 to a threaded opening in a vessel.

Likewise, FIG. 8 shows an embodiment of a body member referenced by numeral 44 having knurls 46 in the outer surface surrounding the outlet that is not a reduced diameter section.

Figure 10:
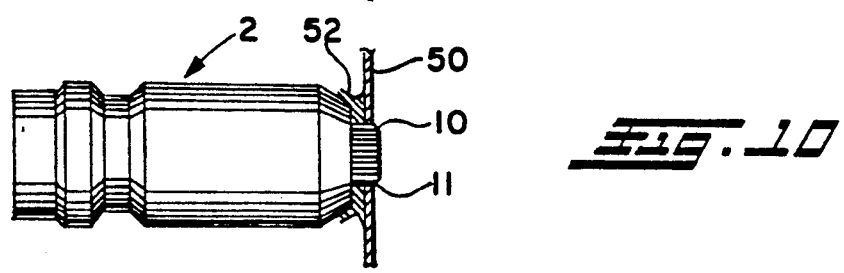
FIG. 10 is a side view of the body member of FIGS. 1 and 2 fixedly secured to a vessel.

FIG. 10 illustrates how the knurled outlet end of body member 2 can be used to advantage in fixedly securing it in an opening 11 in a vessel having a wall 50. In this case, knurls 20 are advantageous to provide increased surface area to which a solder or other liquified metal 52 such as a braze adhere to fixedly secure body member 2 to the vessel.

The various components of the control valve of the invention can be made from one or more metal or plastic materials or combination thereof suitable for particular applications. Of particular advantage for use in controlling fluid refrigerant flow is where the body member is made from a suitable aluminum or steel alloy; the sealing member is made from a suitable rubber; the coiled spring is made from a suitable metal; and the guide member and pin member are made from a suitable metal or plastic material.

Additionally, an assembly of comprising guide member, pin member, biasing member, and sealing member of the control valve of the invention is operable for use with virtually any body member that enables the assembly to be secured within the body member with an outer portion of the sealing member compressed against an annular sealing surface to provide a fluid seal therebetween and with an inner portion engagable by an enlarged head of the pin member to provide a fluid seal therebetween.

Although the present invention has been described herein with a certain degree of particularity, it is to be understood that the description herein is made by way of example only and that numerous changes in the details of construction and combination of the parts may be resorted to without departing from the scope of the invention as hereinafter claimed.

What is claimed is:

1. A control valve for controlling fluid flow under pressure, said valve comprising:
   a body member having a wall surrounding a chamber extending therethrough between an inlet and an outlet,
   said body member having an annular shoulder extending from the wall into the chamber and having an annular sealing surface facing towards the inlet and having an annular sealing surface facing inwardly towards a centerline of the body member;
   a guide member having a wall surrounding a chamber extending therethrough between an open-end and a closed-end with the closed-end having a port extending therethrough;
   said guide member having an annular securement surface surrounding the open-end and facing away from the closed-end;
   a fluid sealing member secured to the guide member securement surface;
   said guide member secured to the guide member chamber with the open-end facing towards the body member outlet and the closed-end facing towards the body member inlet with an annular outer portion of the sealing member compressed in fluid sealing engagement against the body member sealing surfaces facing towards the body member inlet and inwardly towards the centerline of the body member and having an annular inner portion of the sealing member exposed to the body member outlet;
   a pin member having an enlarged head facing towards the exposed sealing member portion from the body member outlet and engageable therewith, said pin member having a stem extending substantially transversely away from the head and through the guide member chamber ad closed-end port and ending at a free-end disposed at the predetermined distance from the guide member closed-end; and
   means for resiliently biasing the pin member towards the body member inlet with a preselected biasing force operative to cause the head to engage and press against the exposed sealing member portion sufficiently to establish a fluid seal therebetween effective to prevent the fluid from flowing from the body member outlet toward the body member inlet.

2. The control valve of claim 1 wherein the inner surface of the body member wall and the outer surface of the guide member wall are threaded and the guide member is a swivel member that is rotatively threadingly secured within the body member chamber.

3. The control valve of claim 1 wherein the biasing means is a coiled spring disposed coaxially about the pin member stem between the free-end thereof and the guide member closed-end and the stem includes means for containing the spring therebetween.

4. The control valve of claim 3 wherein the means for containing the spring is a headed end of the stem.

5. The control valve of claim 1 wherein the body member wall adjacent to the outlet includes means for securing the body member to a fluid vessel.

6. The control valve of claim 5 wherein the vessel has a circular threaded opening, at least a section of the body member wall adjacent the outlet has a substantially tubular configuration, and the means for securing the body member to the vessel are threads disposed in the tubular section outer surface that are operative to threadingly engage the vessel opening threads and releasably secure the body member to the vessel upon rotation of the body member.

7. The control valve of claim 5 wherein the vessel has an opening and the means for securing the body member to the vessel is a knurled section that is disposed in the outer surface of the body member wall adjacent the outlet and operative to be received into the vessel opening and to enhance a fixed securement of the body member to the vessel.

8. The control valve of claim 7 wherein the knurled section is a substantially tubular knurled section.

9. The control valve of claim 6 or 7 wherein the section is a reduced section.

10. The control valve of claim 8 wherein the section is a reduced section.

11. The control valve of claim 1 wherein at least a portion of the stem extending from the guide member closed-end to the stem free-end is surrounded by the body member wall.

12. The control valve of claim 13 wherein the stem portion is the entire length of the stem extending from the free-end to the guide member closed-end.

13. The control valve of claim 6 wherein the body member wall includes at least one pair of opposed flats in the outer surface for engagement by a tool to effect the rotation of the guide member.

14. The control valve of claim 1 wherein the sealing member is a resilient sealing member.

15. The control valve of claim 14 wherein the resilient sealing member is resilient rubber sealing member.

16. The control valve of claim 1 wherein the head of the pin member is provided with an annular tapered surface thereon that faces towards the inner exposed portion of the sealing member and tapers radially outwardly away from the stem free-end to enhance the fluid seal established upon engagement therebetween.

* * * * *